United States Patent
Huizenga

(10) Patent No.: US 6,854,870 B2
(45) Date of Patent: Feb. 15, 2005

(54) VEHICLE HANDLE ASSEMBLY

(75) Inventor: David J. Huizenga, Holland, MI (US)

(73) Assignee: Donnelly Corporation, Holland, MI (US)

(*) Notice: Subject to any disclaimer, the term of this patent is extended or adjusted under 35 U.S.C. 154(b) by 9 days.

(21) Appl. No.: 10/184,540

(22) Filed: Jun. 28, 2002

(65) Prior Publication Data

US 2003/0031025 A1 Feb. 13, 2003

Related U.S. Application Data

(60) Provisional application No. 60/302,099, filed on Jun. 30, 2001.

(51) Int. Cl.$^7$ .............................. B60Q 1/26; E05B 65/12
(52) U.S. Cl. ......................... 362/501; 362/85; 362/394; 70/239; 70/278.1
(58) Field of Search ......................... 70/237, 239, 256, 70/257, 278.1–278.3; 180/287, 289; 307/10.2; 362/85, 100, 394, 501

(56) References Cited

U.S. PATENT DOCUMENTS

| | | | |
|---|---|---|---|
| 3,908,149 A | | 9/1975 | Gergoe et al. ................. 315/84 |
| 4,041,301 A | | 8/1977 | Pelchat ....................... 240/2.13 |
| 4,898,010 A | * | 2/1990 | Futami et al. .............. 70/278.1 |
| 4,983,947 A | * | 1/1991 | Mullen et al. ......... 340/426.28 |
| 5,297,010 A | | 3/1994 | Camarota et al. .............. 362/80 |
| 5,651,163 A | | 7/1997 | Tamaki ........................ 16/112 |
| 5,828,299 A | * | 10/1998 | Chen ........................... 340/468 |
| 5,844,470 A | * | 12/1998 | Garnault et al. ............ 340/5.62 |
| 5,952,731 A | * | 9/1999 | McPherson et al. ........ 307/10.2 |
| 5,960,942 A | * | 10/1999 | Thornton ..................... 200/314 |
| 6,070,998 A | * | 6/2000 | Jennings et al. ............. 362/501 |
| 6,075,294 A | * | 6/2000 | Van den Boom et al. . 307/10.1 |
| 6,084,317 A | * | 7/2000 | Wolfe et al. ................ 307/10.4 |
| 6,098,433 A | * | 8/2000 | Maniaci ...................... 70/278.1 |
| 6,135,621 A | | 10/2000 | Bach et al. .................. 362/399 |
| 6,158,867 A | * | 12/2000 | Parker et al. .................. 362/29 |
| 6,164,805 A | | 12/2000 | Hulse .......................... 362/501 |
| 6,367,295 B1 | * | 4/2002 | Agostini et al. .............. 70/257 |
| 6,378,344 B1 | * | 4/2002 | Gartner ...................... 70/278.1 |
| 6,550,946 B2 | * | 4/2003 | Misawa et al. ............. 362/501 |
| 2003/0095416 A1 | * | 5/2003 | Huizenga ..................... 362/501 |

FOREIGN PATENT DOCUMENTS

| | | |
|---|---|---|
| DE | 29921826 | 4/2000 |
| GB | 2298748 | 9/1996 |

* cited by examiner

Primary Examiner—Alan Cariaso
(74) Attorney, Agent, or Firm—Van Dyke, Gardner, Linn & Burkhart, LLP

(57) ABSTRACT

A handle assembly for a vehicle includes a base, which is adapted to mount to a vehicle, and a handle portion, which is movably mounted to the base. The handle portion is adapted to connect to a vehicle latching mechanism. The handle assembly includes at least one switch mounted to the handle portion and an electrical circuit, which is adapted to connect to a locking control system for the vehicle latching mechanism. The switch is adapted to open and close the electrical circuit to generate electrical signals to the locking control system to unlock the vehicle latching mechanism.

57 Claims, 3 Drawing Sheets

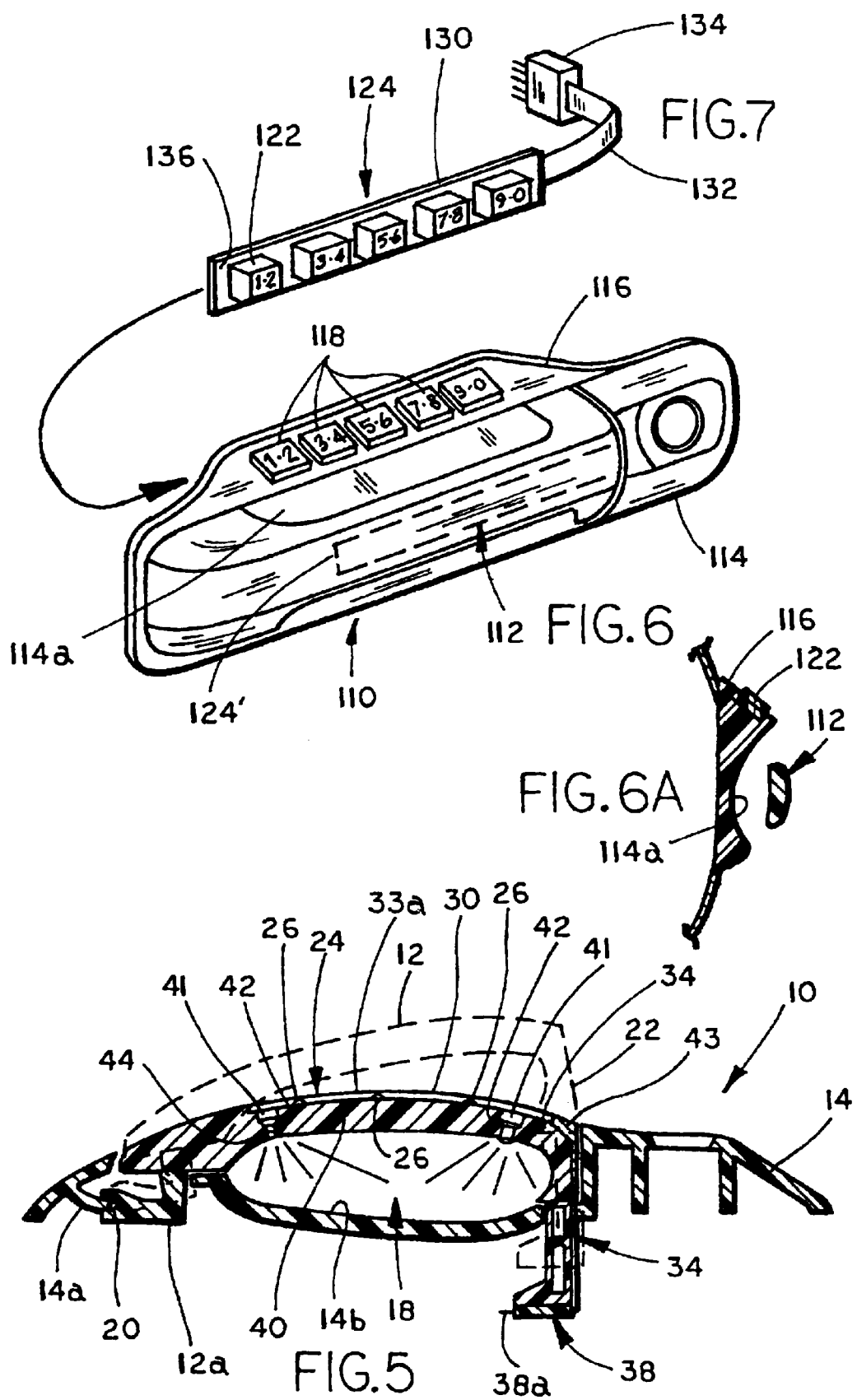

VEHICLE HANDLE ASSEMBLY

This application claims priority from U.S. Provisional Application Ser. No. 60/302,099, filed Jun. 30, 2001, entitled VEHICLE HANDLE ASSEMBLY, by Applicant David J. Huizenga, and is incorporated by reference herein in its entirety.

BACKGROUND OF THE INVENTION

The present invention relates to door handle assemblies and, more particularly, to door handle assemblies for vehicles.

Until recently, door handle assemblies for vehicles have been purely mechanical devices, requiring a handle portion, which is coupled to a latching mechanism, to be rotated or pivoted to either latch or unlatch the latching mechanism. In addition, a key has been typically required to lock or unlock the latching mechanism. For example, some door handle assemblies include a strap type handle, which pivots about one end of the handle. The pivoting end of the handle is coupled to a latch mechanism, for example by a cable or a linkage, which is actuated by the pivoting of the handle. Other door handle assemblies include a paddle type handle, which is mounted to a pivotal shaft, for example, in a recessed portion of the door, with the shaft being coupled to the latch mechanism, which is actuated by the pivoting of the shaft. Other styles include tailgate assemblies, including T-shaped handles that rotate about their central axis to latch or unlatch the latch mechanism. Typically, these door handle assemblies are fabricated as a unitary assembly and attached to the door.

More recently, some vehicles have incorporated electrical components, which provide a key-less locking or unlocking device. The electrical components typically include a numerical keypad that requires the keys of the keypad to be pressed in a pre-selected sequence in order to unlock the latching mechanism. In addition, these electrical components have also been adapted to permit remote unlocking of the vehicle, which is particularly useful in extreme weather conditions or in low light conditions, especially where safety may be a concern. While it is known to have electrical components associated with some styles of handles, these electrical components heretofore have been bulky and expensive. As a result, these electrical components have been some what limited in their use and have not been implemented in more compact door handle assemblies where the geography of the handle assembly provides insufficient mounting space for the key pad and the associated wires and connectors.

Consequently, there is a need to extend the use of electrical components to a wide variety of door handle assemblies so that the more compact door handle assemblies may have the full range of key-less entry options.

SUMMARY OF THE INVENTION

According to the present invention, a door handle assembly includes a base and a handle portion, which is mounted to the base. The handle portion is movably mounted to the base and coupled to a latch mechanism, such that movement of the handle portion actuates the latch mechanism. A flexible circuit member is mounted to the handle assembly, which includes a carrier that supports an electric circuit and at least one switch. The flexible circuit member can be placed on the handle portion itself, which provides electrical actuation of the locking or unlocking of the latch mechanism associated with the handle assembly.

In one form of the invention, a handle assembly for a vehicle includes a base, which is adapted to mount to a vehicle, and a handle portion, which is movably mounted to the base and is adapted to connect to a vehicle latching mechanism. The handle assembly further includes at least one switch, which is mounted to the handle portion, and an electrical circuit that is adapted to connect to a locking control system for the vehicle latching mechanism. The switch is adapted to open and close the electrical circuit to generate electrical signals to the locking control system to lock or unlock the vehicle latching mechanism.

In one aspect, the handle assembly further includes a flexible carrier that supports the switch. In a further aspect, the carrier assembly supports a plurality of switches. In addition, the carrier supports at least one light source for illuminating a portion of the base. For example, the light source may light the base through the handle. In one aspect, the handle portion includes at least one transverse passage, with the light source projecting light through the transverse passage for directing light to the base. Optionally, the handle portion further includes a light-directing member in the transverse passage, such as a light pipe, for directing light from the light source to the base.

In another aspect, the handle assembly includes a user actuatable member, with a switch located at the user actuatable member. Furthermore, the light source may be operable to illuminate the user actuatable member. In addition, the light source may be actuatable in response to pressure on the handle portion, movement of the handle portion, actuation of a remote key-less entry device, detection of motion at or near the vehicle, or insertion of a key into the handle assembly keyhole.

In another aspect, the user actuatable member comprises a touch key. In addition, the handle assembly may include a plurality of switches and a key pad having a plurality of touch keys, with each of the switches being adapted to close a circuit to generate an electrical signal to the locking control system. Each of the touch keys is associated with one of the switches.

According to another form of the invention, a handle assembly for a vehicle includes a base, which is adapted to mount to a vehicle, and a handle portion that is movably mounted to the base. The handle portion is operable to latch or unlatch the vehicle latching mechanism via movement of the handle portion relative to the base. The handle assembly further includes a flexible carrier having at least one electrical switch and a user actuatable member associated with the switch. The flexible carrier member is mounted to the handle assembly. The handle assembly also includes a flexible tape that is coupled to the carrier. The flexible tape has an electrical path, with the switch adapted to selectively open and close the electrical path for generating electrical signals to a locking control system for locking or unlocking the vehicle latch mechanism.

In one aspect, the flexible carrier member is mounted to the handle portion. For example, the flexible carrier member may be mounted to the handle portion by an adhesive. In addition, the handle portion includes a recessed portion in which the carrier member is positioned. Preferably, the carrier member is substantially flush with an outer surface of the handle portion when positioned in the recessed portion and mounted to the handle portion. Optionally, the handle portion may include a cover over at least an exposed portion of the flexible tape to protect the flexible tape.

In another aspect, the handle assembly includes at least one light source that is operable to illuminate the user actuatable member. For example, the light source may comprise at least one light emitting diode. The light source may be actuatable in response to pressure on the handle portion, movement of the handle portion, actuation of a remote keyless entry device, detection of motion at or near the vehicle, and insertion of a key into a handle assembly keyhole.

According to another aspect, the handle assembly includes another light source that is operable to illuminate a portion of the base. For example, a flexible carrier member may include the other light source, which may be actuatable in response to pressure on the handle portion, movement of the handle portion, actuation of a remote key-less entry device, detection of motion at or near the vehicle, and insertion of a key into the handle assembly keyhole.

In other aspects, the other light source directs light through the handle portion to illuminate the base. For example, the handle portion may include a transverse opening through which the light source directs light to the base.

In yet another form of the invention, a handle assembly for a vehicle includes a base adapted to mount to a vehicle and a handle portion, which is movably mounted to the base. The handle portion is operable to latch or unlatch a vehicle latching mechanism via movement of the handle portion relative to the base. The handle assembly also includes a light source that is mounted at the handle portion and operable to illuminate a portion of the base.

In one aspect, the light source is operable to direct light through the handle portion to the base. In a further aspect, the base includes a recessed portion, with the light source being operable to illuminate at least the recessed portion.

In another aspect, the handle assembly includes a flexible carrier, which included the light source.

These and other objects, advantages, purposes, and features of the invention will become more apparent from the study of the following description taken in conjunction with the drawings.

DETAILED DESCRIPTION OF THE DRAWINGS

FIG. 5 is a cross-section view taken along line V—V of FIG. 1;

FIG. 6 is a perspective view of another embodiment of the handle assembly of the present invention;

FIG. 6A is a cross-section taken along line VIA—VIA of FIG. 6; and

FIG. 7 is a perspective view of the flexible circuit member of the handle assembly of FIG. 6.

DETAILED DESCRIPTION OF THE PREFERRED EMBODIMENTS

Figure 1:
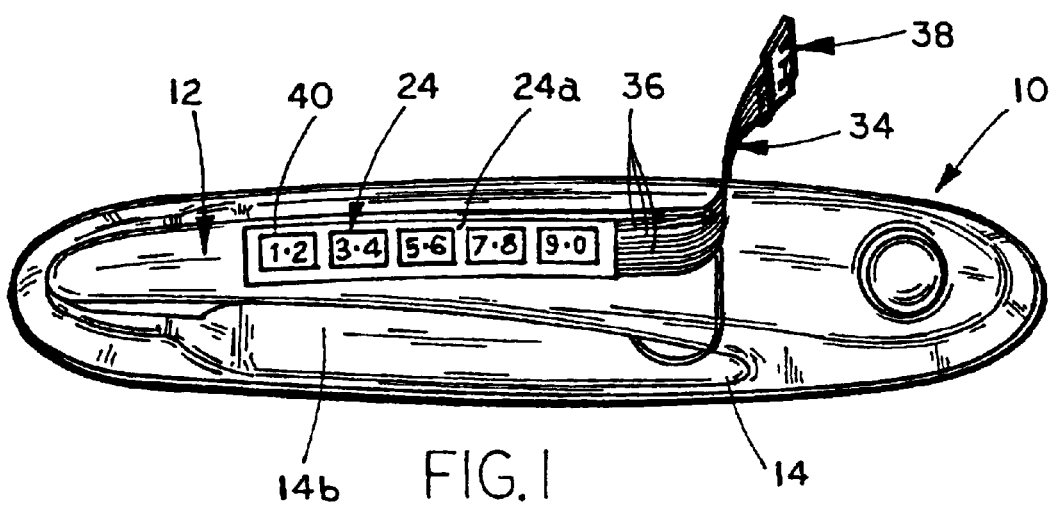
FIG. 1 is a perspective view of a handle assembly of the present invention.

The numeral 10 generally designates a handle assembly of the present invention. As will be more fully described below, handle assembly 10 is adapted to be mounted to a vehicle, such as a side door of the vehicle, and incorporates electrical components that lock or unlock the latching mechanism associated with the handle assembly all in a manner heretofore unknown.

Handle assembly 10 includes a fixed portion 14 and a movable portion 12, which is movably mounted to the fixed portion, and in adapted to move between a home or un-actuated position (as shown in FIG. 5) and a pivoted or actuating position (as shown generally in phantom in FIG. 5). The illustrated embodiment, movable portion 12 comprises a strap or strap-type handle or handle portion 12, and fixed portion 14 comprises a base. Handle portion 12 is pivotal base 14 about a vertical axis 20 on one end of handle portion 12 which causes the second end of handle portion 12 to lift away from base and the body of the vehicle when pulled and to pull on a cable or linkage (not shown) within the door of the vehicle to release a latch (also not shown) and, thus, open the door of the vehicle from the outside of the vehicle.

As best seen in FIG. 5, handle portion 12 is generally L-shaped with a leg 22 extending through base 14 to couple to the cable or linkage, as noted above. Handle portion 12 is preferably molded as a one-piece body and preferably molded from a substantially rigid and strong polymeric material, such as thermo plastic or a thermo-set material, such as nylon. In addition, handle portion 12 may incorporate a soft touch surface, which is molded, for example to one or more surfaces of handle portion 12 by a thin film molding process such as described in reference to co-pending application entitled VEHICLE POOR HANDLE, Ser. No. 09/597,532, filed Jun. 20, 2000, now U.S. Pat. No. 6,349,450 which is incorporated by reference herein in its entirety.

On one end, handle portion 12 includes an L-shaped pivot member 12a which extends through base 14 and is pivotally mounted to a mounting flange 14a of base 14 about pivot axis 20. L-shaped pivot member 12a is captured on mounting flange 14a between a pair of webs 15a and 15b formed on back wall 16 of base 14. Beneath handle portion 12, back wall 16 includes a recessed portion 14b, which forms a recessed finger cup area 18 that extends above and below handle portion 12. Leg 22 of handle portion 12 similarly extends through base 14 and includes a linkage or cable mounting arm 23 connected thereto. Mounting arm 23 couples to a spring 25, which applies a spring force to handle portion 12 to urge it to its home or un-latched position. Base 14 is preferably integrally molded as a one-piece member from a substantially rigid and strong material, such as a thermo-plastic or thermo-set material.

Preferably, the handle assembly components, such as the handle portion or the base, are manufactured in molding operations that impart such components with lightweight capability but while still maintaining their structural integrity and performance. Such lightweight molding methods include an aerated injection molding process, such as the MUCELL™ process described in U.S. Pat. application Ser. No. 09/679,997, filed Oct. 15, 2000. now U.S. Pat No. 6,669,267, which is herein incorporated by reference in its entirety. Alternately, blow molding can be used during molding of, for example, a plastic handle or base, so that the weight of the component is reduced thereby. Another benefit from using lightweight molded components is that the process requires a lower tonnage for the molding apparatus, which decreases the cost for production for example by increasing cycle times.

Referring again to FIG. 1, handle portion 12 further includes a flexible circuit member 24 mounted thereto, which couples to an electrical locking control system which locks or unlocks the latching mechanism to permit the door (on which handle assembly 10 is mounted) to be opened. As will be more fully described below, flexible circuit member 24 includes one or more switches 32 which are actuatable by pressure applied to the outer surface 24a of flexible circuit member 24. When switches 32 are closed (by the applied pressure) in the correct sequence, the vehicle locking control system unlocks the latch mechanism of the vehicle.

Figure 3:
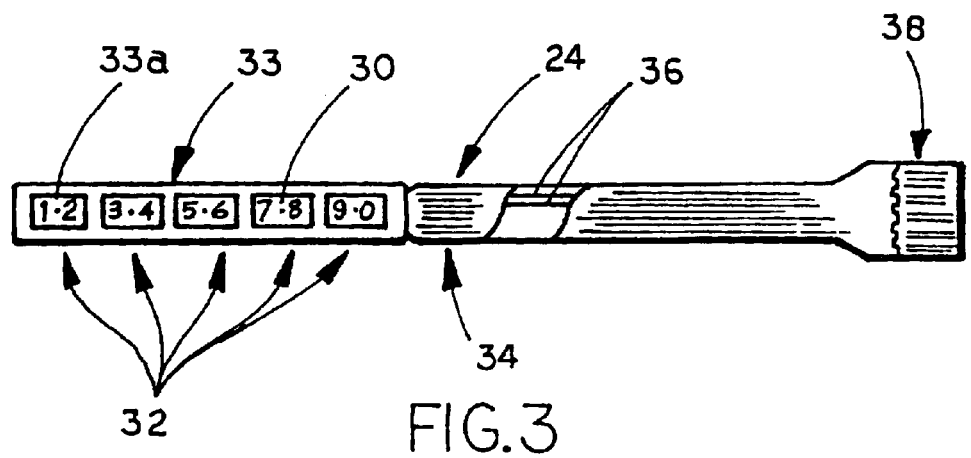
FIG. 3 is an enlarged view of the flexible circuit of FIG. 1.
Figure 4:
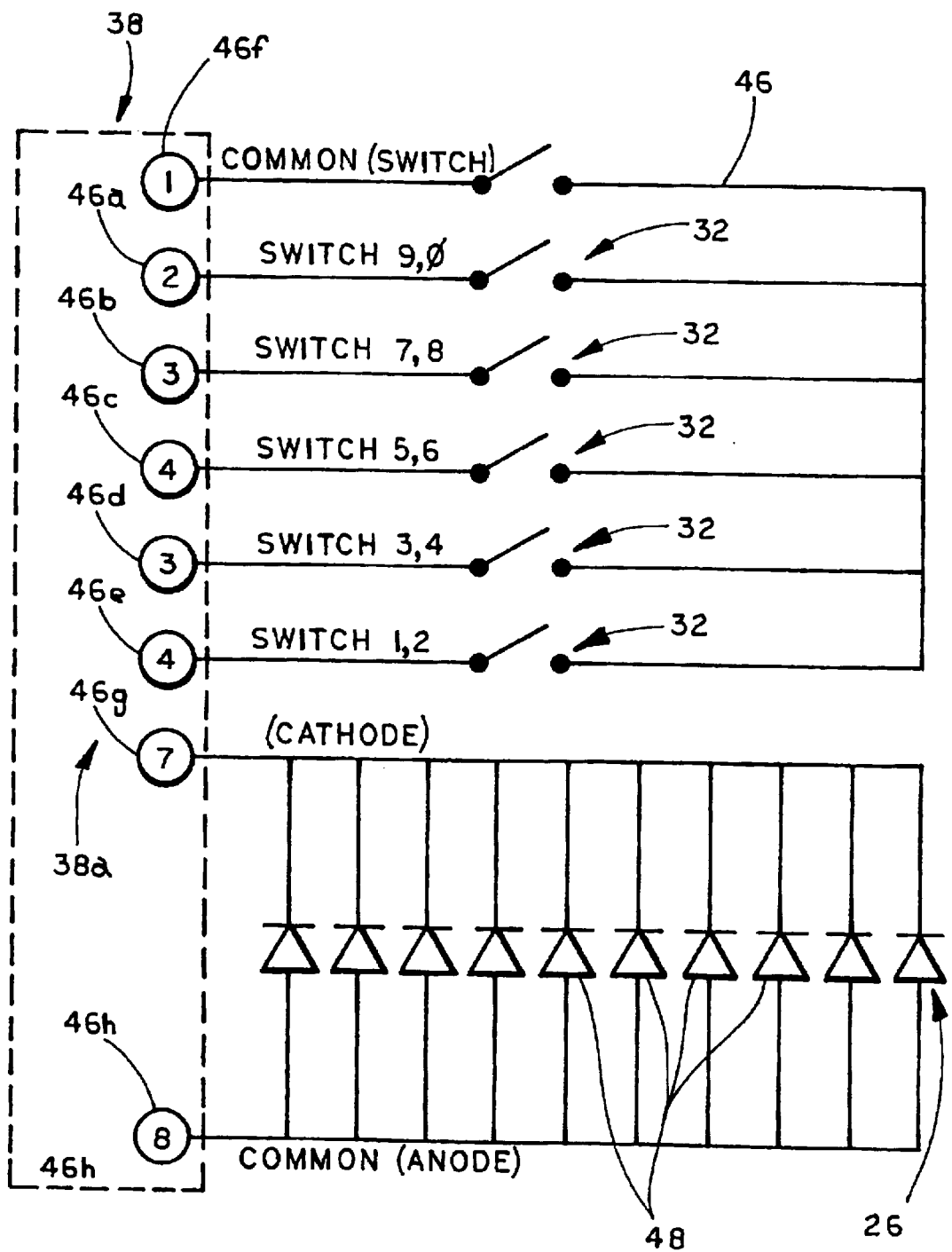
FIG. 4 is a schematic diagram of the circuit of FIG. 3.

Referring to FIGS. 3 and 4, flexible circuit member 24 comprises a flexible carrier member 30, which includes a plurality of switches 32. Formed on an upper surface 30a of carrier is a keypad 33 with touch keys 33a that correspond to switches 32. As will be described below, when a driver or passenger of the vehicle wishes to open a door mounted with the handle assembly of the present invention, he or she can merely press the appropriate keys 33a of keypad 33 to unlock the door of the vehicle. Carrier member 30 is formed from a flexible laminate, which supports a plurality of contacts and circuits in a spaced or separated relationship to form switches 32. Upon pressure being applied to one of the keys, the contact associated therewith closes the circuit thereby enabling current to be delivered through the circuit. In the illustrated embodiment, carrier member 30 includes five keys or switches—however, it should be understood that the number of switches may be varied as needed.

Flexible circuit member 24 also includes a tape member or flexible circuit 34 which includes a plurality of electrical paths or conduits 36 and a connector 38, which houses or supports a corresponding plurality of pins. Pins 38a are coupled to the respective electrical conduits to provide electrical paths between switches 32 and the individual pins of connector 38. Connector 38 couples to the logic of the vehicle logic control system, which generates locking and unlocking signals to a conventional electrical actuator lock or latch mechanism, which may include a solenoid driver, in response to switches 32 being closed in a pre-selected sequence. Such vehicle logic control systems and electrically actuated lock or latch mechanisms are conventional and are well known in the art. Though illustrated with five switches, flexible circuit member 24 may include just one or two switches, with one switch being coupled, for example to the trunk latch mechanism.

In addition, flexible circuit member 24 may incorporate one or more light sources 26 in carrier member 30, which back light keys 33a of key pad 33. Light sources 26 may comprise light emitting diodes (LEDs), including high current LEDs or the like such as disclosed in copending U.S. Provisional Application Ser. No. 60/271,466, filed Feb. 26, 2001, which is incorporated by reference herein in its entirety, or may comprise electroluminescent lights, fluorescent lights, incandescent lights or the like. Preferably, illumination of light sources 26 is deactivated after the vehicle is running. Optionally, the circuit which powers light sources 26 may include a lockout device, such as a lockout circuit, so that light sources 26 and 41 can not be used while the vehicle is being driven. Such lockout circuits are conventional, and one such suitable circuit is described in U.S. Pat. No. 5,371,659, which is incorporated by reference in its entirety. Light sources 26 are activatable in response to a number of inputs. For example, light sources may be actuated in response to signals from a sensor, such as a proximity sensor that detects when a person approaches the vehicle, for example, by detecting motion at or near the vehicle, such as at or near the side of the vehicle. Such detection may be via touching of the handle. Such a sensor may detect movement of the handle portion or insertion of a key into the lock cylinder of the door. A remote key-less entry device may also actuate light sources 26. Preferably, light source 26 is actuatable for a limited duration of time so that the light source is deactivated a period of time following activation of the light source. In this manner, the light source may be temporarily activated as a person approaches or contacts the handle, which eases the unlocking of the vehicle especially in low light conditions. These light sources may further provide ground illumination of the area by the vehicle, similar to the security light assemblies disclosed in U.S. Pat. Nos. 5,371,659, 5,669,699, 5,823,654 and 5,497,305, which are commonly assigned to Donnelly Corporation of Holland, Mich. and which are hereby incorporated herein by reference in their entireties. When activated, the light source 26 preferably draws a low current from its power source, such as the vehicle battery. In this manner, the impact on the power source is minimized.

Carrier 30 may also incorporate one or more light sources 41 that are mounted inwardly towards handle portion 2 to direct light through handle portion L2 to illuminate cup area 14b of base 14. In the illustrated embodiment, light sources 41 align with transverse passages 42 provided in handle portion 12 so that light passes through handle portion to illuminate cup portion 14b. Optionally positioned in each passage 42 is a light directing member, such as a light pipe, including an acrylic light pipe, or lens, which directs and diffuses the light from light source(s) 41 towards base 14 to illuminate. Preferably, light pipe 44 directs the light from light source(s) 41 in a light pattern that spreads the light across cup area 14b of base 14.

Light sources 26 and 41 preferably comprise light emitting diodes (LEDs) which are powered by electrical conduits housed in flexible circuit 34 and which are coupled to a respective pair of pins in connector 38 for coupling to the vehicle electrical system or to the vehicle logic control system, including for example a vehicle area network, as noted above. In this manner, lights 26 and 41 may be actuated independently of switches 32 and, optionally, actuated, for example by the vehicle logic circuit or by input from sensors or the like. The present invention, therefore, provides a handle assembly that includes electrical components that can be used to unlock or lock the latching mechanism of the handle assembly and/or that can provide illumination to the handle assembly to facilitate entry into the vehicle. For example, when a driver or a passenger of the vehicle approaches the vehicle, light sources 26 and 41 can be used to illuminate the key pad and can be used to illuminate the handle area of the vehicle to provide increased security to the driver or passengers of the vehicle.

Referring to FIG. 5, handle portion 12 optionally includes a recessed portion 40 for receiving carrier 30 of flexible circuit member 24. Flexible circuit member 24 has a slim profile, which can be optionally mounted flush in handle 12 in recessed portion 40. Flexible circuit 34 extends from carrier 30 along leg 22 through base 14. Connector 38 (which is coupled to flexible circuit 34) is mounted to the distal end of leg 22 of handle portion 12. In this manner, when handle portion 12 is moved between its home or un-actuated state and its pivoted or actuated state, flexible circuit member 24 moves with handle portion 12. Optionally and preferably, handle portion 12 includes a cap or cover 43 that covers flexible circuit 34 to protect circuit 34 and, further, to provide a more aesthetic appearance for handle assembly 10.

Referring to FIG. 4, each switch 32 includes a power line which connects to a respective pin 46a, 46b, 46c, 46d, and 46e of connector 38 and a common ground line 46 which connects to pin 46f of connector 38. As noted above, carrier 30 optionally includes one or more light sources 26, such as LEDs 48, to backlight keys 33a, which connect to respective a ground pin 46g and a power pin 46h of connector 38. In the illustrated embodiment, each key 33a has two numerals associated therewith so that users of keys 33a can associate therewith a number sequence. However, it should be understood that keys 33a may incorporate other indicia, including alpha characters, a combination of alphanumeric characters, or the like. In addition, the characters may be illuminated by light sources instead of the whole keypad, such as by light sources 26 and, further, may have a raised profile so that the characters associated with the key can be detected by touch.

Figure 2:
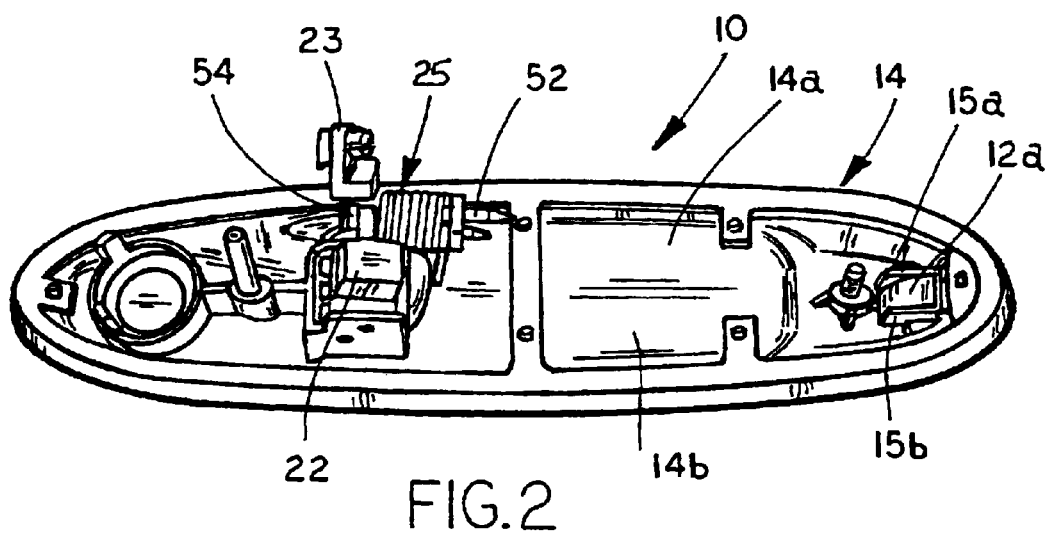
FIG. 2 is a bottom plan view of the handle assembly of FIG. 1.

Referring to FIG. 2, base 14 includes a pair of threaded fasteners for mounting base 14 to the side door of a vehicle. As noted above, base 14 supports spring 25, which applies a spring force to leg 22 of handle portion 12 to urge handle portion 12 to its home or un-actuated position (shown in solid in FIG. 5). Spring 25 is mounted to a shaft 52, which is supported between a pair of mounting flanges 54 that are mounted to or formed on the underside of base 14. It should be understood that the specific configuration of the handle assembly and latch mechanism may be varied and, further, the present invention may incorporate the flexible circuit member at other locations as will be more fully described below.

Referring to FIG. 6, the numeral 110 generally designates another embodiment of the handle assembly of the present invention. Handle assembly 110 similarly includes a fixed portion or base 114 and a movable or a handle portion 112 similar to the previous embodiment. In the illustrated embodiment, base 114 includes an extended portion 116 which extends above cup area 114a and includes a plurality of openings 118 for receiving projecting buttons 122 of flexible circuit member 124. Furthermore, carrier 130 is positioned behind base 114, which eliminates the possibility of the flexible circuit member being inadvertently removed from the handle assembly.

Flexible circuit member 124 is of similar construction to flexible circuit member 24 and includes a carrier 130 and a flexible circuit 132 with a connector 134. Carrier 130 is similarly formed from a flexible laminate that supports contacts and circuits in a spaced apart relationship and, further, includes a key pad 136 with raised or projecting buttons 122 corresponding to the contacts so that when the buttons are pressed the associated contact makes contact with the circuit to close the circuit. Similar to the previous embodiment, connector 134 extends into the door for coupling to the vehicle logic control system to thereby control the latching mechanism for the door on which handle assembly 110 is mounted.

Referring to FIG. 6A, enlarged portion 116 may be angled so as to position buttons 122 at a suitable orientation for viewing by a person standing next to the vehicle mounted with the handle assembly of the present invention. In addition, as noted in reference to flexible carrier member 24, carrier member 124 may include one ore more LEDs for illuminating buttons 122. Furthermore, handle portion 112 may optionally incorporate a second flexible circuit member 124' similar to flexible member 24, which incorporates a plurality of inwardly projecting light sources, such as LEDs, for illuminating the cup portion 114a of base 114.

While several forms of the invention have been shown and described, it should be apparent from the study of the drawings and description that further modifications may be made with out departing from the scope of the invention. For example, the flexible circuit members may be incorporated into the base or the paddle of paddle-type assemblies or the base or handles of tailgate handle assemblies, including T-shaped handles. In addition, the number of switches may be increased or decreased as needed and, furthermore, may be arranged in a non-linear pattern. For example, the flexible circuit members of the present invention may be incorporated at other locations on the handle assembly including, for example at the thumb portion or the base or may be incorporated on the base below the handle. In addition, the light from the light sources may be directed inwardly to the finger cup area as described or may be directed downwardly to illuminate the door of the vehicle (instead of or in addition to the handle assembly). Alternately, a selected light or light sources may be directed to illuminate the cup area, while the other light sources may be directed to direct light downwardly to illuminate the door or the ground area adjacent the door of the vehicle. Therefore, the present invention provides a unitary handle assembly that can be quickly and easily installed in a vehicle at a manufacturing plant. Furthermore, the handle assembly of the present invention incorporates electrical components that provide input to a vehicle logic control system for locking or unlocking latching mechanisms for doors, tailgates, or trunks and, further, that provide optimal lighting features which illuminate the base of the handle assembly to ease the grasping of the handle during low light conditions, which enhances security.

The handle assemblies of the present invention may incorporate a wide variety of additional features, such as antennas, including global positioning system (GPS) or cellular phone antennas or an antenna for a passive entry system, transmitters and/or receivers, such as garage door openers, including a HOMELINK® system, a camera, such as for a rear-vision aid system, or a side or close object detection system, which includes one or more sensors, such as a radar, including a Doppler radar, an ultrasound sensor, or an infrared sensor. For example, when a driver of the vehicle is driving in a tight or confined space, the sensor would detect close objects and generate warning signals to the driver. For example, the sensor may be coupled to a display mounted in the interior of the vehicle, such as the interior mirror assembly. The sensor may trigger a pre-configured warning display to be displayed or may be further couple to a camera that sends images of the object (that is in close proximity to the side of the vehicle) for display. In this manner, the driver is alerted and may use the images to guide the vehicle away from or around the object to avoid contact with the object. Alternately or in addition, the sensor may generate a warning signal when the vehicle door is opened near an object so that the driver or passenger of the vehicle can adjust the movement of the door to avoid contact with the object; thereby averting potential damage to the vehicle door. The sensor or sensors may also be used to avoid collisions with other vehicles. For example, when a driver of a vehicle equipped with the handle assembly of the present invention is driving next to another vehicle and the adjacent vehicle moves too close to the side of the vehicle mounted with the present system, for example when the other vehicle drifts unintentionally or intentionally into the driver's lane, the sensor will alert the driver of the vehicle to the approaching vehicle so that the driver can take the appropriate action to avoid a collision. Examples of other suitable accessories may be found in copending application entitled VIDEO MIRROR SYSTEM, Ser. No. 09/793,002, filed Feb. 26, 2001, now U.S. Pat. No. 6,690,268, which is incorporated by reference herein in its entirety.

While several forms of the invention have been shown and described, other forms will now be apparent to those skilled in the art. Therefore, it will be understood that the embodiments shown in the drawings and described above are merely for illustrative purposes, and are not intended to The embodiments of the invention in which I claim an exclusive property right or privilege are defined as follows:

1. A handle assembly for a vehicle said handle assembly comprising:
    a base adapted to mount to a vehicle;
    a handle portion movably mounted to said base, said handle portion being adapted to connect to a vehicle latching mechanism;
    a flexible circuit member mounted to said handle portion, said flexible circuit member conformable to a surface of said handle portion, said flexible circuit member having a touch keypad with a plurality of touch keys, each of said touch keys associated with a switch;
    said flexible circuit member adapted to connect to a locking control system for the vehicle latching mechanism, said switches being adapted to generate electrical signals to the locking control system to unlock the vehicle latching mechanism when said touch keys are pressed in a preselected sequence.

2. The handle assembly according to claim 1, wherein said flexible circuit member comprises a flexible carrier, said flexible carrier supporting said switches.

3. The handle assembly according to claim 2, wherein said carrier further supports at least one light source for illuminating a portion of said base.

4. The handle assembly according to claim 1, further comprising at least one light source operable to illuminate at least one of said touch keys.

5. The handle assembly according to claim 4, wherein said at least one light source comprises at least one light emitting diode.

6. A handle assembly according to claim 3, for a vehicle, said handle assembly comprising:
    a base adapted to mount to a vehicle
    a handle portion moveably mounted to said base, said handle portion being adapted to connect to a vehicle latching mechanism;
    at least one switch mounted to said handle portions;
    a flexible carrier, said flexible carrier supporting said switch, said carrier further supporting at least one light source for illuminating a portion of said base; and
    an electrical circuit adapted to connect to a locking control system for the vehicle latching mechanism, said switch being adapted to open and close said electrical circuit to generate electrical signals to the locking control system to unlock the vehicle latching mechanism, wherein said light source lights said portion through said handle portion.

7. The handle assembly according to claim 6, wherein said carrier supports a plurality of said switches.

8. The handle assembly according to claim 6, wherein said handle portion includes at least one transverse passage extending therethrough, said light source projecting light through said transverse passage on said portion of said base.

9. The handle assembly according to claim 8, wherein said handle portion includes a light directing member in said transverse passage for directing the light from s light source to said portion of said base.

10. The handle assembly according to claim 9, wherein said light directing member comprises a light pipe.

11. The handle assembly according to claim 10, wherein said light pipe comprises an acrylic light pipe.

12. The handle assembly according to claim 6, further comprising a user actuatable member, said switch located as said user actuatable member.

13. The handle assembly for a vehicle, said handle assembly comprising:
    a base adapted to mount to a vehicle;
    a handle portion moveably mounted to said base, said handle portion being adapted to connect to a vehicle latching mechanism;
    at least one switch mounted to said handle portion;
    a user actuatable member, said switch located at said actuatable member;
    at least one light source operable to illuminate said user actuatable member; and
    an electrical circuit adapted to connect to a locking control system for the vehicle latching mechanism, said switch being adapted to open and close said electrical circuit to generate electrical signals to the locking control system to unlock the vehicle latching mechanism wherein said light source is adapted to be actuatable in response to at least one of a touch of said handle portion, a movement of said handle portion, actuation of a remote key-less entry device, a detection of motion at the vehicle, and an insertion of a key into a handle assembly keyhole.

14. The handle assembly according to claim 14, wherein said user actuatable member comprises a touch key.

15. The handle assembly according to claim 14, further comprising a plurality of said switches and a key pad having a plurality of touch keys, each of said switches being adapted to close a circuit to generate an electrical signal to the locking control system, and each of said touch keys being associated with one of said switches.

16. The handle assembly according to claim 15, wherein said keypad has at least one light source for illuminating said touch keys.

17. A handle assembly for a vehicle, said handle assembly comprising:
    a base adapted to mount to a vehicle;
    a handle portion mounted to said base, said handle portion being operable to latch or unlatch a vehicle latching mechanism via movement of said handle portion relative to said base;
    a flexible carrier having a plurality of electrical switches and a corresponding plurality of user actuatable members associated with said switches, said mounted to said handle portion assembly; and
    a flexible tape coupled to said carrier, said flexible tape having electrical paths, said switches adapted to selectively open and close said electrical paths to generate electrical signals to a locking control system for locking or unlocking the vehicle latching mechanism when said user actuatable members are actuated in a preselected sequence.

18. The assembly of claim 17, wherein said handle portion includes an outer side and an inner side facing said base, said flexible carrier member being mounted at said outer side of said handle portion.

19. The assembly of claim 17, wherein said flexible carrier member is mounted to said handle portion by an adhesive.

20. The handle assembly of claim 17, wherein said handle portion includes a recessed portion, said carrier member positioned in said recessed portion.

21. The handle assembly of claim 20, wherein said carrier member is substantially flush with an outer surface of said handle portion when positioned in said recessed portion and mounted to said handle portion.

22. The handle assembly according to claim 17, further comprising at least one light source operable to illuminate at least one of said user actuatable members.

23. The handle assembly according to claim 22, wherein at least one light source comprises at least one light emitting diode.

24. The handle assembly of claim 2, further comprises another light source operable to illuminate a portion of said base.

25. The handle assembly of claim 24, where in said flexible carrier member includes said other light source.

26. The handle assembly of claim 17, wherein said base includes a recess defining a finger cup area.

27. The handle assembly of claim 26, wherein said carrier member includes at least one light source operable to illuminate at least a portion of said recesses.

28. The handle assembly of claim 17, wherein said handle portion comprises a strap handle.

29. The handle assembly of claim 17, wherein said user actuatable members comprise buttons.

30. A handle assembly for a vehicle, said handle assembly comprising:
a base adapted to mount to a vehicle;
a handle portion movably mounted to said base, said handle portion being operable to latch or unlatch a vehicle latching mechanism via the movement of said handle portion relative to said base;
a flexible carrier having at least one electrical switch and a user actuatable member associated with said switch, said flexible carrier mounted to said handle portion, said handle portion including a recessed portion, said carrier member positioned in said recess portion; and
a flexible tape coupled to said carrier, said flexible tape having an electrical path, with switch adapted to selectively open and close said electrical path for generating electrical signals to a locking control system for locking or unlocking the vehicle latching mechanism, said handle portion having a cover over at least an exposed portion of said flexible tape to protect to protect said flexible tape.

31. The handle assembly according to claim 30, wherein said flexible carrier conforms to a contour of said handle portion.

32. A handle assembly for a vehicle, said handle assembly comprising:
a base adapted to mount to a vehicle;
a handle portion movably mounted to said base, said handle portion being operably to latch or unlatch a vehicle latching mechanism via movement of said handle portion relative to said base;
a flexible carrier having at least one electrical signal and a user actuatable member associated with said switch, said flexible carrier mounted to said handle assembly;
at least one light source operable to illuminate said user actuatable member, wherein said light source is adapted to be actuatable in response to one of a touch of said handle portion, a movement of said handle portion, actuation of a remote key-less entry device, a detection of motion at the vehicle, and an insertion of a key into a handle assembly keyhole; and
a flexible tape coupled to said carrier, said flexible tape having an electrical path, said switch adapted to a locking control system for locking or unlocking the vehicle latch mechanism.

33. A handle assembly for a vehicle, said handle assembly comprising:
a base adapted to mount to a vehicle;
a handle portion moveably mounted to said base, said handle portion being operable to latch or unlatch a vehicle latching mechanism via movement of said handle portion relative to said base;
a flexible carrier having at least one electric member associated with said switch, said flexible carrier mounted to said handle assembly;
at least one light source operable to illuminate said user actuable member;
another light source operable to illuminate a portion of said base, wherein said flexible carrier member includes said other light source, and wherein said other light source is adapted to be actuatable in response to at least one of a touch of said handle portion, a movement of said handle portion, actuation of a remote key-less entry device, a detection of motion at the vehicle, and am insertion of a key into a handle assembly keyhole and a flexible tape coupled to said carrier, said flexible tape having an electrical path, said switch adapted to selectively open and close said electrical path for generating electrical signals to a locking control system for locking and unlocking the vehicle latching mechanism.

34. The handle assembly of claim 33, wherein said flexible carrier is mounted to said base.

35. The handle assembly of claim 34, wherein said flexible carrier includes a plurality of user actuatable members and a plurality of said switches, each said switches being adapted to selectively open and close an electrical path to generate electrical signals to the locking control system, said user actuatable members being associated with said switches.

36. A handle assembly for a vehicle, said handle assembly comprising:
a base adapted to mount to a vehicle;
a handle portion moveably mounted to said base, said handle portion being operable to latch or unlatch a vehicle latching mechanism via movement of said handle portion relative to said base;
a flexible carrier having at least one electrical switch and a user actuatable member associated with said switch, said flexible carrier mounted to said handle assembly;
at least one light source operable to illuminate a portion of said base, wherein said flexible carrier member includes said other light source and wherein said other light source, and wherein said other light directs light through said handle to a locking control system for locking or unlocking the vehicle latching mechanism;
a flexible tape coupled to said carrier, said flexible tape having an electrical path, said switch adapted to selectively open and close said electrical path for generating electrical signals to a locking control system for locking or unlocking the vehicle latching mechanism.

37. A handle assembly for a vehicle, said handle assembly comprising:
a base adapted to mount to a vehicle;
a handle portion moveably mounted to said base, said handle portion being operable to latch or unlatch a vehicle latching mechanism via movement of said handle portion relative to said base;
a flexible carrier having at least one electrical switch and a user actuatable member associated with said switch, said flexible carrier mounted to said handle assembly;

at least one light source operable to illuminate said user actuatable member; another light source operable to illuminate a portion of said base, wherein said flexible carrier member includes said other light source, and wherein said handle portion includes a transverse opening, said other light source directing light through said transverse opening; and a flexible tape coupled to said carrier, said flexible tape having an electrical path, said switch adapted to selectively open and close said electrical path for generating electrical signals to a locking control system for locking or unlocking the vehicle latching mechanism.

38. The handle assembly of claim 37, wherein said base includes a recess defining a finger cup area.

39. A handle assembly of a vehicle, said handle assembly comprising:

a base adapted to mount to a vehicle;

a handle portion movably mounted to said base, said handle portion being operable to latch or unlatch a vehicle latching mechanism via movement of said handle portion relative to said base, and said handle portion having an outer side and an inner side facing said base;

a flexible circuit member mounted to said handle portion; and said flexible circuit member comprising a flexible carrier supporting a plurality of light sources, said handle portion having a plurality of openings extending through said inner side, and said light sources projecting light through said handle portion and and through said openings to illuminate a portion of said base.

40. The handle assembly of claim 39, further comprising a plurality of light directing members to direct light from said light sources through said handle portion and said openings.

41. The handle assembly of claim 40, wherein said base includes a recessed portion defining a finger cup area, said light source being operable to illuminate said recessed portion.

42. The handle assembly of claim 40, wherein said light directing members comprise light pipes.

43. The handle assembly of claim 40, wherein light directing members comprise lenses.

44. The handle assembly of claim 39, wherein said light sources comprise light emitting diodes.

45. The handle assembly of claim 44, wherein said handle portion comprises a strap handle.

46. The handle assembly for a vehicle, said handle assembly comprises a fixed portion adapted to mount to a vehicle;

a movable portion movably mounted to said fixed position, said movable portion being adapted to connect to a vehicle latching mechanism, said movable portion having an outer side and an inner side, and inner side facing said fixed portion, and said outer side having a contour; and a flexible circuit member comprising a flexible carrier and a touch key pad, said touch pad having a plurality of touch keys adapted to generate signals to a locking control system for the vehicle latching mechanism, said touch keys adapted to unlock the vehicle latching mechanism when said touch keys are pressed in a predetermined sequence and said flexible circuit member being mounted at said outer side of said movable portion and following said contour.

47. The handle assembly according to claim 46, wherein said flexible circuit member includes a plurality of switches, said switches being adapted to generate signals to the locking control system.

48. The handle assembly according to claim 47, wherein said carrier is coupled to a flexible tape with a plurality of electrical paths, said switches opening and closing said electrical paths to generate said signals.

49. The handle assembly according to claim 48, wherein said carrier further supports at least one light source for illuminating a portion of said fixed portion.

50. A handle assembly for a vehicle, said handle assembly comprising:

a fixed portion adapted to mount to a vehicle;

a movable portion movably mounted to said fixed portion, said movable portion being adapted to connect to a vehicle latching mechanism;

at least one switch mounted to said movable portion;

a flexible carrier, said flexible carrier including a plurality of switches, including said at least one switch, said carrier further supporting at least one light source for illuminating a portion of said fixed portion, said light source lighting said portion of said fixed portion through said movable portion; and an electrical circuit adapted to connect to a locking control system for the vehicle latching mechanism, said switches being adapted to generate electrical signals to the locking control system through said electrical circuit to unlock the vehicle latching mechanism.

51. The handle assembly according to claim 50, wherein said movable portion includes at least one transverse passage extending therethrough, said light source projecting light through said transverse passage on said fixed portion.

52. The handle assembly according to claim 51, wherein said movable portion includes a light directing member in said transverse passage for directing the light from said light source to said portion of fixed portion.

53. The handle assembly according to claim 52, wherein said light directing member comprises a light pipe.

54. The handle assembly according to claim 50, further comprising user actuatable members, said switches located at user actuatable members.

55. The handle assembly according to claim 54, further comprising at least one light source operable to illuminate said actuatable members.

56. The handle assembly according to claim 55, wherein said at least one light source comprises at least one light emitting diode.

57. A handle assembly for a vehicle, said handle assembly comprising:

a fixed portion adapted to mount to a vehicle;

a movable portion movably mounted to said fixed portion, said movable portion being adapted to connect to a vehicle latching mechanism;

at least one switch mounted to said movable portion; a user actuatable member, said switch located at said user actuatable member;

at least one light source operable to illuminate said user actuatable member wherein said at least one light source comprises at least one light emitting diode, and wherein said light source is actuatable in response to at least one of said movable portion, a movement of said movable portion, actuation of a remote key-less entry device, a detection of motion at the vehicle, and an insertion of a key into a handle assembly keyhole; and an electrical circuit adapted to connect to a locking control system for the vehicle latching mechanism, said switch being adapted to open and close said electrical circuit to generate electrical signals to the locking control system to unlock the vehicle latching mechanism.

* * * * *

UNITED STATES PATENT AND TRADEMARK OFFICE
CERTIFICATE OF CORRECTION

PATENT NO. : 6,854,870 B2
APPLICATION NO. : 10/184540
DATED : February 15, 2005
INVENTOR(S) : David J. Huizenga It is certified that error appears in the above-identified patent and that said Letters Patent is hereby corrected as shown below:

Column 4
Line 3, "in" should be --is--
Line 6, "The" should be --In the--
Line 9, insert --on-- after "pivotal"
Line 26, "POOR" should be --DOOR--
Line 50, insert --can-- after "methods"

Column 6
Line 15, "2" should be --12--
Line 16, "L2" should be --12--
Line 26, "I4b" should be --14b--

Column 9
Claim 1, Line 6, insert --,-- after "vehicle"
Claim 1, Line 16, insert --and-- after ";"
Claim 6, Line 35, delete "according to claim 3," after --assembly--
Claim 6, Line 37, insert --;-- after "vehicle"
Claim 6, Line 38, "moveably" should be --movably--
Claim 6, Line 41, "portions;" should be --portion;--
Claim 9, Line 60, "s" should be --said--
Claim 12, Line 66, "as" should be --at--

Column 10
Claim 13, Line 1, "The" should be --A--
Claim 13, Line 4, "moveably" should be --movably--
Claim 13, Line 9, insert --user-- before "actuatable"
Claim 14, Line 23, "14" should be --13--
Claim 17, Line 37, insert --movably-- before "mounted"
Claim 17, Line 45, insert --flexible carrier-- before "mounted"
Claim 17, Line 46, delete --assembly-- before ";"
Claim 18, Line 52, insert --handle-- after "The"
Claim 19, Line 56, insert --handle-- after "The"

UNITED STATES PATENT AND TRADEMARK OFFICE
CERTIFICATE OF CORRECTION

PATENT NO.      : 6,854,870 B2
APPLICATION NO. : 10/184540
DATED           : February 15, 2005
INVENTOR(S)     : David J. Huizenga It is certified that error appears in the above-identified patent and that said Letters Patent is hereby corrected as shown below:

Column 11
Claim 23, Line 4, insert --said-- after "wherein"
Claim 24, Line 7, "2" should be --22--
Claim 24, Line 7, "comprises" should be --comprising--
Claim 25, Line 10, "where in" should be --wherein--
Claim 27, Line 16, "recesses." should be --recess.--
Claim 30, Line 26, delete "the" after --via--
Claim 30, Line 34, "with" should be --said--
Claim 30, Line 39, delete the second "to protect"
Claim 32, Line 48, "operably" should be --operable--
Claim 32, Line 52, "switch" should be --signal--
Claim 32, Line 62, insert --selectively open and close said electrical path for generating electrical signals to-- after "to"
Claim 32, Line 64, "latch" should be --latching--

Column 12
Claim 33, Line 4, "moveably" should be --movably--
Claim 33, Line 8, "electric member" should be --electrical switch and user actuatable member--
Claim 33, Line 20, "am" should be --an--
Claim 33, Line 21, "keyhole and" should be --keyhole; and--
Claim 33, Line 25, "and" should be --or--
Claim 36, Line 39, "moveably" should be --movably--
Claim 36, Line 46, insert --said user actuable member; another light source operable to illuminate-- after "illuminate"
Claim 36, Line 49, delete ", and wherein said other light" in second occurrence
Claim 36, Lines 50-51, delete "to a locking control system for locking or unlocking the vehicle latching mechanism" and insert --portion to illuminate at least a portion of said base; and" after --handle--
Claim 37, Line 61, "moveably" should be --movably--

UNITED STATES PATENT AND TRADEMARK OFFICE
CERTIFICATE OF CORRECTION

PATENT NO. : 6,854,870 B2
APPLICATION NO. : 10/184540
DATED : February 15, 2005
INVENTOR(S) : David J. Huizenga It is certified that error appears in the above-identified patent and that said Letters Patent is hereby corrected as shown below:

Column 13
Claim 37, Line 2, "actuatable" should be --actuable--
Claim 39, Line 30, "and and" should be --and--
Claim 43, Line 42, insert --said-- after "wherein"
Claim 46, Line 48, "The" should be --A--
Claim 46, Line 49, "comprises" should be --comprising;--
Claim 46, Line 52, "position" should be --portion--
Claim 46, Line 54, "and" should be --said--
Claim 46, Line 58, insert --key-- after "touch"

Column 14
Claim 52, Line 33, insert --said-- before "fixed"
Claim 54, Line 37, insert --said-- before "user"
Claim 55, Line 41, insert --user-- before "actuatable"
Claim 57, Line 52, "actuatable" should be --actuable--
Claim 57, Line 55, insert --,-- after "member"
Claim 57, Line 58, insert --a touch of-- after "at least one of"

Signed and Sealed this

Twentieth Day of January, 2009

JON W. DUDAS
*Director of the United States Patent and Trademark Office*